United States Patent [19]

Wada et al.

[11] Patent Number: 4,598,052
[45] Date of Patent: Jul. 1, 1986

[54] ALUMINA BASE SUBSTRATE OF RECORDING HEAD AND PROCESS FOR THE PRODUCTION THEREOF

[75] Inventors: Toshiaki Wada, Takatsuki; Mitsuhiko Furukawa, Fukuoka; Mitsuyoshi Nagano, Saga; Michito Miyahara, Nakagawa; Shigeki Móri, Tosu, all of Japan

[73] Assignees: Sumitomo Special Metals Co., Ltd., Osaka; Nippon Tungsten Co., Ltd., Fukuoka, both of Japan

[21] Appl. No.: 728,223

[22] Filed: Apr. 29, 1985

[30] Foreign Application Priority Data

May 1, 1984 [JP] Japan ................... 59-88128

[51] Int. Cl.4 .............. C04B 35/10; C04B 35/46; C04B 35/56
[52] U.S. Cl. ................... 501/87; 501/152; 501/153; 360/103; 360/110; 360/122; 264/65
[58] Field of Search ............. 501/87, 152, 153, 127; 360/102, 103, 110, 113, 122; 264/65

[56] References Cited

U.S. PATENT DOCUMENTS 4,130,847 12/1978 Head et al. .............. 360/122
4,251,841 2/1981 Jacobs ................... 360/122
4,356,272 10/1982 Kenemitsu et al. ............ 501/87

Primary Examiner—Mark L. Bell
Attorney, Agent, or Firm—Burns, Doane, Swecker and Mathis

[57] ABSTRACT

An alumina base substrate material for recording heads, which comprises a densely sintered body consisting essentially of:

per 100 parts by weight of a base component of 30 to 40% by weight of a titanium compound having $TiO_2$ to $(TiC+TiO_2)$ percentage of 5 to 15% by weight and the balance being $Al_2O_3$, components A, B and C, provided that the A to B ratio is within a hatched KLMN area in FIG. 1, in the following given parts by weight, and oxidic impurities in amounts of no higher than 0.2% by weight based on the total composition, said sintered body having an average crystal grain size of no higher than 1.3 microns, a porosity per area of no higher than 0.5%, a bending strength of at least 70 kg/cm$^2$ and a hardness $H_RA$ of at least 93.0: wherein component A is at least one of spinels expressed by RO-$Al_2O_3$, where R is at least one of Mg, Mn, Ni and Co, in an amount of 2.0 to 17.5 parts by weight, component B is 0.2 to 2.0 parts by weight of $ZrO_2$, and Component C is 0.05 to 2.0 parts by weight of $Y_2O_3$.

19 Claims, 10 Drawing Figures

ALUMINA BASE SUBSTRATE OF RECORDING HEAD AND PROCESS FOR THE PRODUCTION THEREOF

FIELD OF THE INVENTION

The present invention relates to a substrate (slider) of recording head, particularly for thin film magnetic heads and a process for the production thereof.

BACKGROUND OF THE DISCLOSURE

So far, the disc head sliders for computers have been produced by processing block materials of ferrite. In view of the fact that the ferrite material has a low high-frequency permeability, however, it has been recently attempted to reduce the inductance of the disk heads so as to enable them to operate in a wider high-frequency region. It has also been proposed to enable high-rate transfer of data and enhance recording density by reducing the gap between the head and disk.

There have been developed composite materials such as those which contain aluminum oxide and titanium carbide as the main components, or where titanium nitride is allowed to form solid solution partly with titanium carbide. In addition to the above-mentioned main components, MgO, CaO, NiO, etc., which are known to be effective for aluminum oxide, are added to improve the sintering of those materials.

Referring to the thin film magnetic heads, it is especially required that their substrates be free from even minute pores when subjected to super-precision mirror finishing, and be capable of being readily precision-machined. In order to prevent any minute pores from being present on the substrates subjected to such super-precision mirror finishing for these reasons, mixed ceramic powders should be sintered to substantially theoretical density and, moreover, be of an extremely fine structure and strong intergranular bonding forces of ceramic crystals. However, such ceramic sintered bodies encounter considerable difficulty in machining. To provide a solution to this problem, there has already been developed a material which contains aluminum oxide and titanium carbide as the main components, and further includes MgO, NiO, etc. as a machinability-improving agent in an amount of no higher than 5 parts by weight per 100 parts by weight of said main components (see Japanese Patent Kokai Publication No. 57-135772).

SUMMARY OF THE DISCLOSURE

In the conventional ceramic substrate materials as mentioned hereinabove, the amount of the machinability-improving agent to be added is greater compared with the case where no higher than ca. 1.0% by weight of at least one of MgO, NiO and $Cr_2O_3$ is originally added as the means for inhibiting the growth of aluminum oxide crystal grains. Due to the water solubility of magnesium oxide, etc., that agent tends to solidify without uniformly dispersing upon mixing. In consequence, a problem arises that the structure of the ceramic sintered bodies tends to become uneven. In addition, there is another problem that, when precision-machined according to the track width of the desired disk head slider, they may often chip off at their edges.

An object of the present invention is to provide a novel recording head slider (or a substrate member of the head).

Another object of the present invention is to provide a novel ceramic material for the production of the slider (substrate member) for magnetic head which eliminates the aforesaid problems.

Figure 1:
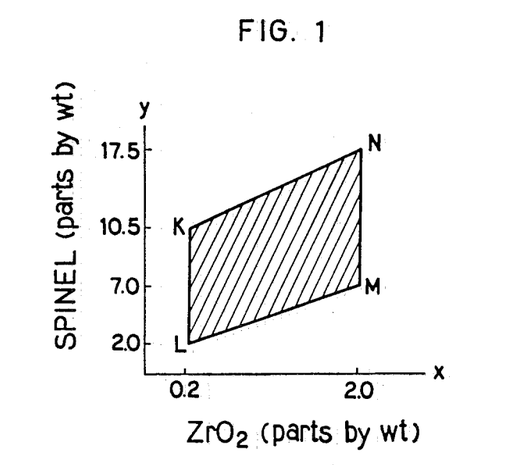
FIG. 1 is a graph showing the weight proportion of Component B ($ZrO_2$, abscissa x) and Component A (spinel, ordinate y)

According to the present invention, such objects are achieved by the provision of a substrate member comprised of a substrate material for recording heads particularly magnetic heads, the substrate material comprising a densely sintered body consisting essentially of:

per 100 parts by weight of a base component comprised of 30 to 40% by weight of titanium compounds, i.e., a mixture of carbide and oxide of Ti having a $TiO_2$ to $(TiC+TiO_2)$ percentage of 5 to 15% by weight and the balance being $Al_2O_3$, Components A, B and C (provided that the A to B ratio is within a hatched KLMN area in FIG. 1) is the following given parts by weight, and oxidic impurities in amounts of no higher than 0.2% by weight based on the total composition, said sintered body having an average crystal grain size of no more than 1.3 microns ($\mu$m), a porosity per area of no more than 0.5%, a bending strength of at least 70 kg/mm$^2$ and a hardness $H_RA$ of at least 93.0; wherein:

Component A is at least one of spinels expressed by $RO\cdot Al_2O_3$ (R=at least one of Mg, Mn, Ni and Co) in an amount of 2.0 to 17.5 parts by weight, Component B is a precision machinability-improving agent $ZrO_2$ in an amount of 0.2 to 2.0 parts by weight, and Component C is $Y_2O_3$ in an amount of 0.05 to 2.0 parts by weight.

Preferably, the densely sintered body should have $Al_2O_3$, TiC, $TiO_2$, $Y_2O_3$, $ZrO_2$ and spinels dispersed uniformly therein and show an average crystal grain size of 0.5 to 1.3 microns, and more preferably 0.7 to 1.3 microns with 90% or more of the overall constitutional crystal grains being within a range of 0.7 to 1.3 microns.

The substrate materials comprising the aforesaid densely sintered body are obtained by sintering a powdery mixture comprised of: TiC and $TiO_2$ (each having an average particle size of no more than 1.5 microns), $Al_2O_3$ (having an average particle size of 1.0 micron), and said components A, B and C (each having an average particle size of no more than 1 micron) in the aforesaid compositional range. It should be noted that, where the average particle sizes of the starting materials exceed the foregoing values, difficulty is involved in uniform dispersion, and the crystal grain size of the resulting sintered bodies exceeds the prescribed values.

It is also required that the aforesaid spinel to $ZrO_2$ ratio (A to B ratio) be within the hatched KLMN area in FIG. 1.

Sintering may be effected by press sintering such as, for instance, hot pressing (or HIP). The sintering temperature and pressure may be about 1350° to 1650° C. and about 150 to 300 kg/cm$^2$ (500 kg/cm$^2$ or higher in the case of the HIP process), at which conditions sintering is carried out for the given period of time, thereby obtaining the requisite sintered bodies. Under the aforesaid sintering conditions a preferred sintering period of time is 0.5 to 2 hours. The substrate materials according to the present invention afford the prescribed extent of densification, and are improved in respect of precision machinability, grindability, toughness and wear resistance.

Accordingly, the present invention provides a recording head, particularly a magnetic head, comprising a slider (or substrate member) made of said substrate material.

BRIEF DESCRIPTION OF THE DRAWINGS

FIGS. 5(a) and (b) are a photograph of the secondary electron image of the surface of one test piece (Sample No. 4 in Table 6) according to one embodiment of the present invention after polishing, and a photograph of the Mg characteristic X-ray image of the same surface, respectively;

THE PREFERRED EMBODIMENTS

The present invention will now be explained with reference to the experiments.

EXPERIMENT I

A. Experimental Procedures and Results

Alpha-$Al_2O_3$ having a purity of 99.9% and an average particle size of 0.3 microns, TiC, $TiO_2$ and $Y_2O_3$ each having a purity of 99.50% and an average particle size of 0.5 micron as well as spinels such as $MgO-Al_2O_3$, $MnO-Al_2O_3$, $NiO-Al_2O_3$, $CoO-Al_2O_3$, etc. and $ZrO_2$ were formulated together in various proportions. The resulting formulations were mixed and pulverized for 20 hours in a ball mill mixer, and then sufficiently dried to prepare the materials for sintering. The materials were charged in a $50 \times 50$ mm-square and 60 mm-high graphite mold, and inserted through a high-frequency coil, where they were held at the given temperatures within the range of 1350° to 1810° C. under a pressure of 200 kg/cm² for 60 minutes in a non-oxidizing atmosphere and, after depressurization, cooled down to room temperature, thereby obtaining the end sintered bodies of $50 \times 50 \times 5.5$ mm. In Table 1 the influence of the varied amounts of $Y_2O_3$ is shown, provided that the $TiO_2$ to ($TiC+TiO_2$) ratio is kept constant at 10% by weight, and the amount of $MgO-Al_2O_3$ is maintained constant at 3.5 parts by weight. Table 1 also indicates the (minimum) sintering temperature required for obtaining sintered bodies of 99.5% or higher of relative theoretical density.

Table 2 shows the results of grindability testing effected with the sintered bodies as specified in Table 1, in which the amount of $Y_2O_3$ was 0.25 parts by weight, and which were grind-finished to $50 \times 50 \times 4.5$ mm. The testing conditions applied in this case were as follows. Each of various test pieces was fixed in place by a jig, and provided with a 0.95 kg-weight through a pulley to determine the time required to cut it over a length of 50 mm with a resinoid-bonded diamond grinding wheel.

Table 3 shows various powdery mixtures obtained by mixing $Y_2O_3$ kept constant at 0.25 parts by weight, 20%, 30%, 40% and 50% of (TiC+$TiO_2$) wherein the $TiO_2$ to (TiC+$TiO_2$) ratio was kept constant at 10% by weight and 1.75 to 19 parts by weight of $MgO-Al_2O_3$, $CoO-Al_2O_3$, $MnO-Al_2O_3$ and $NiO-Al_2O_3$. The mixtures were held at 1620° C. or less under 200 kg/cm² for 60 minutes to obtain sintered bodies measuring $50 \times 50 \times 5.5$ mm having the relative theoretical density of 99.5% or higher.

The bodies were grind-finished to $50 \times 50 \times 5.5$ mm pieces, the grindability (cut-off time) of which was determined according to the same procedures as referred to Table 2. The results are shown in Table 3.

Table 4 explains the influences of the amounts of the spinels added, which act as the machinability-improving agent and are exemplified by $MgO-Al_2O_3$, $CoO-Al_2O_3$, $MnO-Al_2O_3$ and $NiO-Al_2O_3$, and the amounts of $ZrO_2$ added, which acts as a wear resistance-improving agent and simultaneously as a precision machinability-improving agent. To obtain test pieces, the powdery mixtures as specified in Table 4 were sintered so as to achieve 99.5% or higher of the theoretical density at temperatures of 1620° C. or less under the hot pressing conditions of 200 kg/cm² and for 60 min. The thus obtained pieces were grind-finished to $50 \times 50 \times 4.5$ mm to determine the grindability (cut-off time) thereof according to the same conditions as referred to Table 2.

Considerations

Referring to the relations of the compositional and quantitative proportions of the starting materials to hot press sintering, it is found from Table 1 that as the amount of $Y_2O_3$ increase, the requisite hot pressing temperature tends to drop, and that such an effect is observed starting from 0.05 parts by weight. However, the upper amount of $Y_2O_3$ should be limited to 2 parts by weight, since, in an amount exceeding that value, abnormally grown crystal grains may locally be present in the structure of the sintered bodies. Turning to the formulation of ($TiO_2$+TiC), it is difficult to obtain normal sintered bodies where the percentage of $TiO_2$/(TiC+$TiO_2$) exceeds 15% by weight. This is because a vigorous reaction with the graphite mold occurs. Where that percentage is below 5% by weight, on the other hand, the sintering of the $Al_2O_3$-TiC-$TiO_2$ system tends to become insufficient. This seems to be attributable to the fact that too high a percentage of $TiO_2$ to (TiC+$TiO_2$) causes oxidation of TiC with the result of a coarsening of TiC crystal grains, although, in a percentage of up to about 15% by weight, a significant influence is given to sintering properties due to reactions with free carbon in the starting TiC and other components.

The sintering temperature should be limited to 1650° C. or less, since, at temperatures exceeding that, the grain growth becomes so prominent that the grain size of the final sintered products exceeds 1.3 microns on average and, hence, the resultant processed products deteriorate through precision processing. On the other hand, sintering temperatures below 1350° C. result in insufficient sintering. Preferable sintering temperatures are no higher than 1600° C. at which it is possible to obtain materials which have an average crystal grain size of no more than 1 micron and are best suited for super-precision processing.

From the machinability (cut-off time) shown in Table 2, it is noted that the machinability improves with increases in the amount of (TiC+TiO$_2$). In some cases, this effect may be particularly prominent in an amount of 20% by weight or higher.

The various machinability-improving agents as shown in Table 3 are the spinels including oxides generally called the grain growth inhibiting and sintering promoting agents (or sintering aids). Studies were made of changes in the machinability caused by the varied amounts of the machinability-improving agents, provided that the ratio of TiO$_2$ to (TiC+TiO$_2$) was kept constant at 10% by weight, the proportion of (TiC+TiO$_2$) was set at 20, 30 and 40% by weight (at which good grindability is achieved), and the amounts of Y$_2$O$_3$ and ZrO$_2$ were maintained contant at 0.25 parts by weight and 0.3 parts by weight, respectively. In consequence, it has been found that, when MgO-Al$_2$O$_3$, CoO-Al$_2$O$_3$, MnO-Al$_2$O$_3$ and NiO-Al$_2$O$_3$ exceed 2.0 parts by weight, respectively, there is a sharp increase in the grindability. In an amount exceeding 17.5 parts by weight, however, the final products are easy to chip off at their cut potions, although their grindability improves. This is considered as being due to the fact that the sintered grains becomes large in size with the resulting intergranular forces being weak. It is thus desired that the amount of the grindability-improving agents added be 2.0 to 17.5 parts by weight, more preferably 2.0 to 10.5 parts by weight. (TiC+TiO$_2$) functions well in 30% to 40%, but it does not appreciably work in 20%.

Table 4 explains changes in the machinability caused by the varied amounts of the machinability-improving agent and ZrO$_2$, provided that the ratio of TiO$_2$ to (TiC+TiO$_2$) was kept constant at 10% by weight, and the amounts of (TiO$_2$+TiC) and ZrO$_2$ were maintained constant at 35 parts by weight and 0.25 parts by weight, respectively. From Table 4, it is found that the grindability drops with increases in the amount of ZrO$_2$. It is noted, however, that this tendency correlates with the amount of the grindability-improving agent, and no adverse influence is produced with respect to the grindability, as long as the spinel to ZrO$_2$ ratio is within the hatched KLMN area in FIG. 1.

In the formulations as specified in Table 4, certain materials comprising 0.1 part by weight of ZrO$_2$ and 1.75 and 19 parts by weight of the spinels, which depart from the presently claimed scope, are superior in the grindability to those according to the present invention, but it is understood that this is due to the fact that the former materials have a relatively large average crystal grain size, and are inferior in the bending strength and hardness (H$_R$A) to the latter materials. However, the materials departing from the scope of the present invention are all poor in precision machinability and relatively high in porosity, so that they are in many cases unsatisfactory in the fields to which the present invention belongs.

It has now been ascertained that the precision machining cost is within the economical cost if the grindability index is below 100 seconds, but that cost rises with an increasing rate, as the grindability index increases from 100 seconds.

Figure 2A:
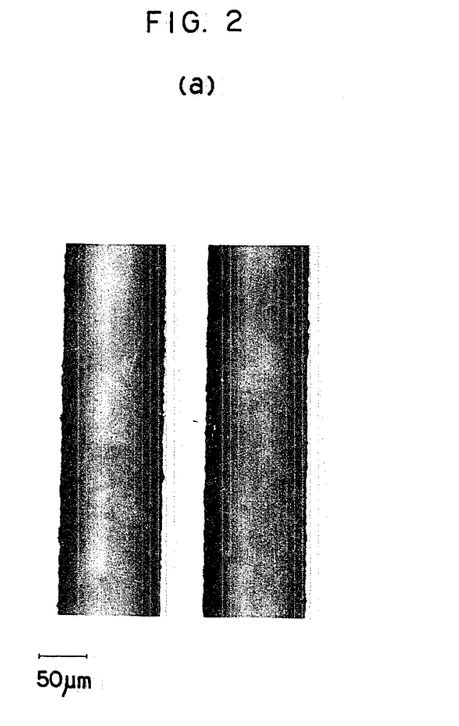
FIGS. 2(a) and (b) are photographs ($\times 200$) showing the cut sections of one embodiment of the present invention and one control embodiment, respectively.
Figure 2B:
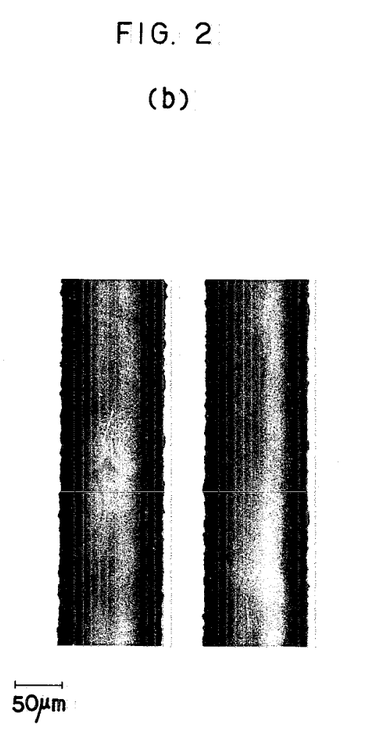

More exactly, it has been confirmed that, as a result of investigations made of the precision machinability of the materials which fall under the hatched KLMN area (including points K, L, M and M) in FIG. 1 defining the amounts of RO-Al$_2$O$_3$ and ZrO$_2$ to be used, they all show a sharp edge equivalent to, or more than, those of the invented materials illustrated in FIG. 2(a), but the materials departing from the KLMN area are inferior to the invented materials of FIG. 2(a), and their edge portions approach the state as illustrated in FIG. 2(b). The cordinates of the points K, L, M and N are as follows:

K (0.2, 10.5)
L (0.2, 2.0)
M (2.0, 7.0)
N (2.0, 17.5)

As the average crystal grain size exceeds 1.3 microns, the strength of material has a tendency to drop, and the micropores contained in its structure have a tendency to gather and become relatively large pores. For those reasons, cracks, micro-chipping, etc. occur so easily upon precision machining that no super-precision machined products are obtained. Furthermore, the relatively large pore may lead to another defect.

What is brought about will embrace a difficulty in precision processing due to the occurrence of micro-chipping, a fear of occurrence of scratches or defects through sliding with a magnetic recording medium, and a possibility that magnetic recording data may drop out by magnetic powder accumulations in the relatively large pore, thus the presence of such pores must be avoided.

It is preferred that the crystal grain size be uniform and as fine as possible, and it is desired that the crystal grains be uniform such that 90% or more thereof is within the range of 0.5 to 1.3 microns. In particular, a grain size exceeding 1.3 microns is unpreferred, since the coarse grains then increases in number. Where the coarse grains are present in a proportion of 10% or more, they may drop off (pool out), or may be attributable to the occurrence of micro-chipping, upon precision machining.

The strength of material is required to be 70 kg/mm$^2$ or more in terms of bending strength so as to prevent that material from cracking or chipping off at its edge, or alternately prevent the structure thereof from pooling out (separating). The porosity per area should be no more than 0.5%, more preferably no more than 0.4%. This is because, when it exceeds 0.5%, the number of pores increases with the resulting drop in strength and precision machinability. The bending strength should be more than 70 kg/mm$^2$, more preferably more than 75 kg/mm$^2$, since, in a bending strength below 70 kg/mm$^2$, cracking, micro-chipping or edge chipping occurs easily during precision processing. The hardness H$_R$A has to be more than 93.0, more preferably more than 93.5, since, in a hardness below 93.0, wear resistance is so deficient that cracking is easy to occur due to sliding with a magnetic recording medium.

EXPERIMENT II

Prepared were various formulations of alpha-Al$_2$O$_3$ of 99.9% by weight in purity and 0.3 microns in average particle size, TiC, TiO$_2$, Y$_2$O$_3$ and ZrO$_2$ each of 99.5% by weight in purity and 0.5 microns in average particle size as well as sintering promoting and machinability-improving agents such as MgO-Al$_2$O$_3$, etc., which were wet-mixed together and pulverized for 20 hours in a ball mill mixer and, thereafter, were sufficiently dried into the materials for sintering. The materials were charged in a graphite mold measuring 50×50×60 mm, and inserted through a high-frequency coil, where they were held at the predetermined temperatures within the range of 1350° to 1600° C. for 60 minutes in an inert gas atmosphere and with the application of 200 kg/cm² and, after depressurization, were allowed to cool to obtain the final sintered bodies measuring 50×50×5.5 mm. The TiO₂/(TiC+TiO₂) ratio employed was 10% by weight, and sintering was carried out by the hot pressing process so as to achieve 99.5% or higher of the relative theoretical density.

Per 100 parts by weight of the base component comprised of 35% by weight (TiC+TiO₂) and 65% by weight Al₂O₃ were added Y₂O₃, MgO-Al₂O₃, ZrO₂ and the like in the proportions as specified in Table 5.

Figure 3:
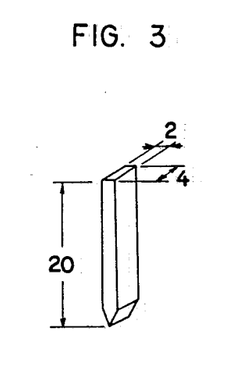
FIG. 3 is a perspective view illustrating the shape of one test piece used to measure the abrasion wear and the coefficient of friction.

Next, the thus obtained sintered bodies were formed into the shape as illustrated in FIG. 3 with the use of a diamond grinding wheel.

Figure 4:
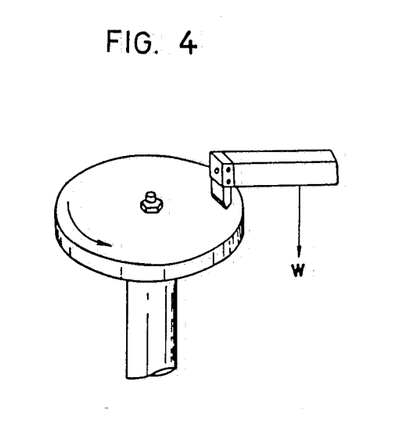
FIG. 4 is a schematic view illustrating one measuring apparatus using the test piece of FIG. 3.

On the other hand, the pin-disc system abrasion testing was carried out in association with a doughnut type disc ferrite formed into φ45–φ10×10 mm. The testing procedures are illustrated in FIG. 4. In testing, the invented (Al₂O₃-TiC system) test piece and the conventional (Al₂O₃-TiC system) test piece were fixed so as to contact with the surface of the disc, and a load (W) was applied in a state of rotating contact to determine the abrasion wear and the coefficient of friction.

The testing conditions are:
Load: 0.95 kg
Friction Velocity: 191.7 m/min.

The results after 12,000 m run are set forth in Table 5.

EXPERIMENT III

The sintered bodies obtained by the procedures of Experiment II, 100[35(TiC+TiO₂)−65Al₂O₃]−3.5-MgO.Al₂O₃−0.25Y₂O₃−0.3ZrO₂ and 100[35(TiC+TiO₂)−65Al₂O₃]−1.0MgO−0.25Y₂O₃, were finished by grinding to a size of 50×50×4.5 mm with the use of a #400 diamond grinding wheel. The finished products were then cut under the condition of 5 mm/min. with the use of a resinoid diamond cutting wheel to determine the cut corner portions thereof, as illustrated in FIG. 2.

CONSIDERATIONS

It has turned out that, based upon the comparison in the wear resistance upon contacting with ferrite between two materials, one of which comprise 100 parts by weight of 35% by weight of (TiC+TiO₂) with the priviso that the TiO₂/(TiC+TiO₂) percentage is maintained at 10% by weight and 65% by weight of Al₂O₃ and Y₂O₃ is a constant amount of 0.25 parts by weight, as well as which contain the machinability-improving agents MgO-Al₂O₃ and MgO, and one of which further includes ZrO₂, the MgO-Al₂O₃ and ZrO₂-containing materials are superior in wear resistance, and lower in the coefficient of friction as well. This is one of the important properties required for magnetic head slider material.

The cut section of the sintered bodies of TiC-TiO₂-Al₂O₃ cut by a diamond cutting wheel as shown in FIG. 2 exhibits that the MgO.Al₂O₃-ZrO₂-containing body is sharper at the corner portions than the other, which means that precision machinability is excellent, correspondingly.

EXPERIMENT IV

Prepared were various formulations of alpha-Al₂O₃ having a purity of 99.9% by weight and an average particle size of 0.3 microns, TiC, and TiO₂ each having a purity of 99.5% by weight and an average particle size of 0.5 microns as well as the sintering promoting- and grindability-improving agent and wear resistance-improving agent such as Y₂O₃, MgO, MgO-Al₂O₃ and ZrO₂, which were wet-mixed and pulverized for 20 hours in a ball mill mixer and, in turn, sufficiently dried into the materials for sintering. The materials for sintering were filled in a graphite mold measuring 50×50×60 mm, and placed in a high frequency coil, where they were maintained at temperatures of 1350° to 1600° C. for 60 minutes in a non-oxidizing atmosphere and with the application of a pressure of 200 kg/cm² and, after depressurization, allowed to cool resulting in the end sintered bodies measuring 50×50×5.5 mm and having a relative theoretical density of 99.5% or higher. It is noted in this connection that the TiO₂/(TiC+TiO₂) ratio and the amount of Y₂O₃ were maintained constant at 10% by weight and 0.25 parts by weight, respectively.

Subsequently, the sintered bodies were cut into a size of 4×8×25 mm and polished to measure the properties thereof, as set forth in Table 6. Sample No. 6 was prepared by sintering the material so as to achieve a relative theoretical density of 95% by hot pressing, followed by hot isostatic pressing (HIP) sintering at 1450° C. and 1800 kg/cm² in an argon gas atmosphere.

Figure 5:
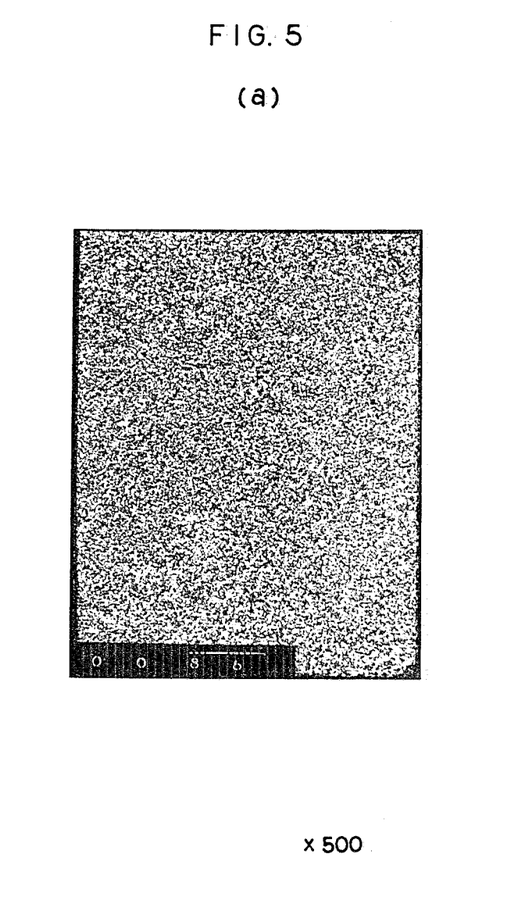
Figure 5B:
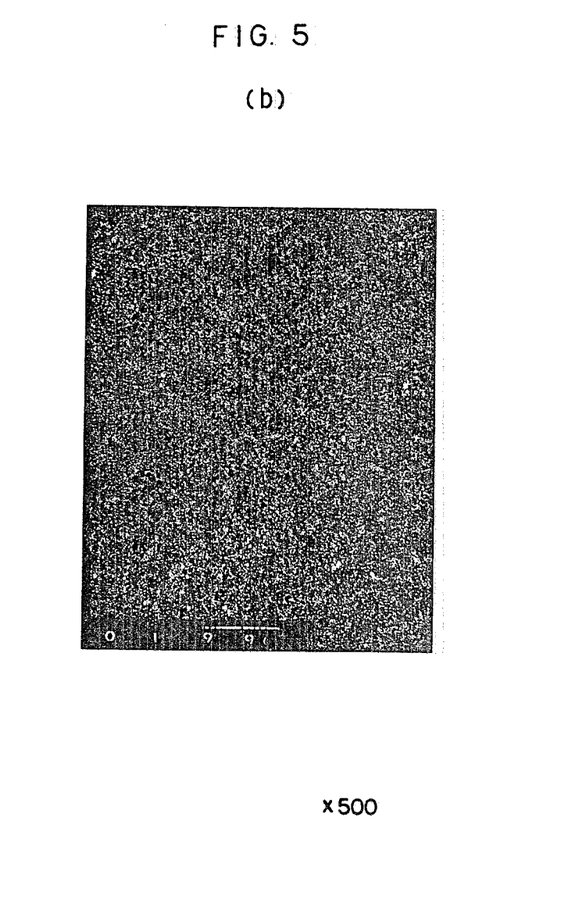
Figure 6:
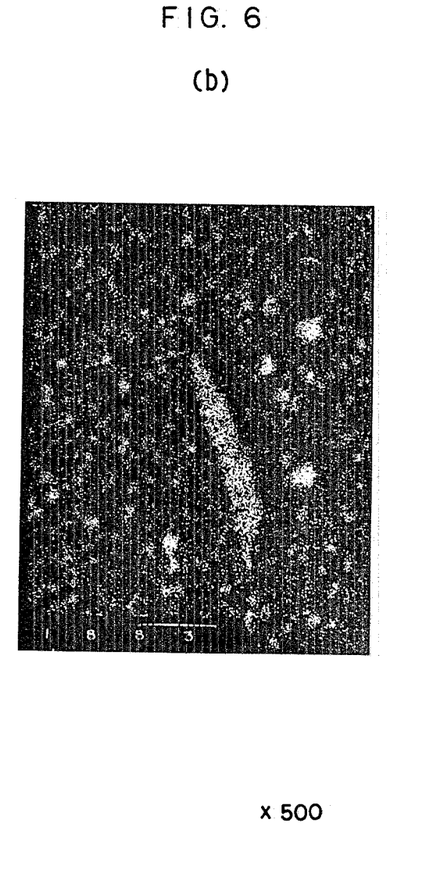
Figure 6A:
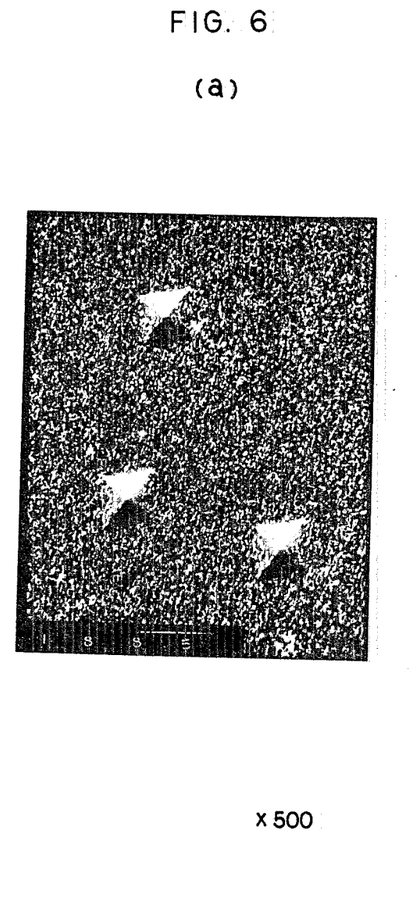
FIGS. 6(a) and (b) are a photograph of the SEI secondary electron image of the surface of one control embodiment (Sample No. 14 in Table 6) after polishing, and a photograph of the Mg characteristic X-ray image of the same surface, respectively.

FIGS. 5(a) and 6(a) show the secondary electron images of the surfaces of Sample Nos. 4 and 14 after polishing, and FIGS. 5(b) and 6(b) do the Mg-K alpha-characteristic X-ray images of the same surfaces, which were observed with an X-ray microanalyzer. Considerations The structure of Sample No. 4 has an average grain size of as small as 0.8 microns, and is uniform. As shown in FIG. 5, example No. 4 has Mg dispersed uniformly therein. In Sample No. 14, on the other hand, MgO agglomerates locally, and is unevenly dispersed, as evident from FIG. 6(b). This appears to be attributable to the fact that MgO is water-soluble so that it tends to agglomerate upon drying following powder mixing. It is noted that, in FIG. 6(a) SEI, three star marks indicate dents formed by an Vickers indenter so as to fix the samples in place for measurement.

TABLE 1

| Y₂O₃ parts | $\dfrac{TiC + TiO_2}{Al_2O_3 + TiC + TiO_2} \times 100$ | | | | | | | |
| by weight | 10 | 15 | 20 | 30 | 40 | 50 | 60 | 70 |
| --- | --- | --- | --- | --- | --- | --- | --- | --- |
| 0.025 | 1460° C. | 1510° C. | 1550° C. | 1730° C. | 1770° C. | 1780° C. | 1790° C. | 1810° C. |
| 0.050 | 1410 | 1430 | 1440 | 1560 | 1650 | 1660 | 1720 | 1800 |
| 0.250 | 1400 | 1420 | 1430 | 1560 | 1620 | 1660 | 1720 | 1750 |
| 0.500 | 1400 | 1410 | 1420 | 1550 | 1620 | 1650 | 1720 | 1730 |
| 1.000 | 1400 | 1410 | 1410 | 1550 | 1620 | 1650 | 1710 | 1730 |
| 1.500 | 1390 | 1410 | 1410 | 1540 | 1610 | 1640 | 1710 | 1720 |
| 2.000 | 1390 | 1410 | 1410 | 1540 | 1600 | 1640 | 1710 | 1720 |

TABLE 1-continued

| $Y_2O_3$ parts by weight | $\dfrac{TiC + TiO_2}{Al_2O_3 + TiC + TiO_2} \times 100$ | | | | | | | |
|---|---|---|---|---|---|---|---|---|
| | 10 | 15 | 20 | 30 | 40 | 50 | 60 | 70 |
| 2.500 | 1380 | 1410 | 1410 | 1530 | 1600 | 1640 | 1710 | 1720 |

N.B. $\dfrac{TiO_2}{TiC + TiO_2} \times 100 = 10\%$ by weight (constant), $MgO.Al_2O_3 = 3.5$ parts by weight (constant), $ZrO_2 = 0.3$ parts by weight (constant)

TABLE 2

| $\dfrac{TiC + TiO_2}{Al_2O_3 + TiC + TiO_2} \times 100$ | 10 | 15 | 20 | 30 | 40 | 50 | 60 |
|---|---|---|---|---|---|---|---|
| cutting time (sec) | 140 | 130 | 110 | 99 | 95 | 95 | 91 |

N.B. $Y_2O_3 = 0.25$ parts by weight (constant)

TABLE 3

| $\dfrac{TiC + TiO_2}{Al_2O_3 + TiC + TiO_2} \times 100$ | 1.75 | 2.0 | 7.0 | 15 | 17.5 | 19 | 1.75 | 2.0 | 7.0 | 15 | 17.5 | 19 |
|---|---|---|---|---|---|---|---|---|---|---|---|---|
| | \multicolumn{6}{c}{$MgO.Al_2O_3$} | \multicolumn{6}{c}{$CoO.Al_2O_3$} |
| 20% by weight | 114 | 110 | 108 | 104 | 100 | 98 | 115 | 112 | 110 | 105 | 100 | 99 |
| 30 | 103 | 98 | 97 | 97 | 95 | 94 | 105 | 99 | 97 | 96 | 95 | 95 |
| 40 | 100 | 96 | 94 | 93 | 92 | 91 | 102 | 98 | 95 | 96 | 94 | 93 |
| 50 | 96 | 95 | 92 | 90 | 89 | 89 | 99 | 96 | 95 | 92 | 91 | 90 |
| | \multicolumn{6}{c}{$MnO.Al_2O_3$} | \multicolumn{6}{c}{$NiO.Al_2O_3$} |
| 20% by weight | 113 | 108 | 108 | 105 | 102 | 100 | 116 | 112 | 109 | 108 | 107 | 103 |
| 30 | 102 | 97 | 97 | 95 | 94 | 93 | 104 | 99 | 98 | 98 | 97 | 97 |
| 40 | 101 | 95 | 95 | 94 | 93 | 91 | 103 | 98 | 97 | 96 | 99 | 95 |
| 50 | 100 | 94 | 92 | 93 | 91 | 90 | 103 | 98 | 95 | 94 | 94 | 92 |

$TiO_2 \times 100/(TiC + TiO_2) = 10\%$ by weight (constant),
$Y_2O_3 = 0.25$ parts by weight (constant),
$ZrO_2 = 0.3$ parts by weight (constant)

TABLE 4

$\dfrac{TiC + TiO_2}{Al_2O_3 + TiC + TiO_2} \times 100 = 35\%$ by weight (constant), $\dfrac{TiO_2 \times 100}{TiC + TiO_2} = 10\%$ by weight (constant), $Y_2O_3 = 0.25$ parts by weight (constant)

| $ZrO_2$ parts by weight | $RO.Al_2O_3$ parts by weight | | | | | | | | | | | |
|---|---|---|---|---|---|---|---|---|---|---|---|---|
| | 1.75 | 2.0 | 5.0 | 7.0 | 10.5 | 17.5 | 19 | 1.75 | 2.0 | 7.0 | 10.5 | 17.5 | 19 |
| | \multicolumn{7}{c}{$MgO.Al_2O_3$} | \multicolumn{6}{c}{$MnO.Al_2O_3$} |
| 0.1 | 99 | 94 | 94 | 94 | 93 | 92 | 90 | 98 | 94 | 92 | 90 | 90 | 89 |
| 0.2 | 103 | 97 | 94 | 95 | 93 | 92 | 92 | 102 | 96 | 95 | 93 | 92 | 92 |
| 1.0 | 105 | 98 | 95 | 94 | 95 | 93 | 94 | 106 | 97 | 95 | 94 | 93 | 92 |
| 2.0 | 108 | 99 | 97 | 96 | 96 | 95 | 94 | 108 | 99 | 97 | 96 | 95 | 94 |
| 2.5 | 115 | 107 | 103 | 104 | 102 | 103 | 102 | 111 | 105 | 104 | 103 | 103 | 101 |
| | \multicolumn{7}{c}{$CoO.Al_2O_3$} | \multicolumn{6}{c}{$NiO.Al_2O_3$} |
| 0.1 | 101 | 95 | 94 | 93 | 91 | 90 | 100 | 95 | 94 | 92 | 92 | 91 |
| 0.2 | 104 | 97 | 96 | 96 | 95 | 94 | 93 | 103 | 98 | 97 | 97 | 96 | 95 |
| 1.0 | 106 | 98 | 97 | 96 | 96 | 95 | 94 | 105 | 98 | 98 | 97 | 98 | 96 |
| 2.0 | 109 | 99 | 97 | 98 | 97 | 97 | 96 | 108 | 99 | 98 | 98 | 99 | 98 |
| 2.5 | 117 | 109 | 107 | 104 | 102 | 100 | 98 | 114 | 108 | 105 | 104 | 102 | 99 |

N.B. 1 Materials wherein ratios of $\dfrac{TiC + TiO_2}{Al_2O_3 + TiC + TiO_2}$, $\dfrac{TiO_2}{TiC + TiO_2} \times 100$, or $Y_2O_3$ amount were varied in various combination thereof were prepared in the substantially same manner and tested. The results showed that good machinability of the cutting time less than 100 seconds was obtained within the claimed scope of the present invention.

TABLE 5

| Sample | abrasion wear (mm$^3$) | coefficient of friction |
|---|---|---|
| [35(TiC + TiO$_2$)—65Al$_2$O$_3$]—3.5MgO.Al$_2$O$_3$—0.3ZrO$_2$—0.25Y$_2$O$_3$ | 0.150 | 0.31 |
| [35(TiC + TiO$_2$)—65Al$_2$O$_3$]—3.5MgO.Al$_2$O$_3$—0.25Y$_2$O$_3$ | 0.190 | 0.32 |
| [35(TiC + TiO$_2$)—65Al$_2$O$_3$]—1.0MgO—0.25Y$_2$O$_3$ | 0.200 | 0.33 |
| [35(TiC + TiO$_2$)—65Al$_2$O$_3$]—1.0MgO—0.3ZrO$_2$—0.25Y$_2$O$_3$ | 0.197 | 0.32 |

TABLE 6

| Sample No. | Composition | Bending Strength (Kg/mm$^2$) | Hardness (H$_R$A) | Grain Size (μm) |
|---|---|---|---|---|
| 1 | [30(TiC + TiO$_2$)—70Al$_2$O$_3$] 3.5MgO.Al$_2$O$_3$—0.25ZrO$_2$ | 79 | 93.5 | 1.0 |
| 2 | [30(TiC + TiO$_2$)—70Al$_2$O$_3$] | 75 | 93.5 | 1.0 |
| 3 | [30(TiC + TiO$_2$)—70Al$_2$O$_3$] 7MgO.Al$_2$O$_3$—0.4ZrO$_2$ 17.5MgO.Al$_2$O$_3$—0.4ZrO$_2$ | 72 | 93.2 | 1.0 |

TABLE 6-continued

| Sample No. | Composition | Bending Strength (Kg/mm$^2$) | Hardness (H$_R$A) | Grain Size (μm) |
|---|---|---|---|---|
| 4 | [37(TiC + TiO$_2$)—63Al$_2$O$_3$] 3.5MgO.Al$_2$O$_3$—1.25ZrO$_2$ | 70 | 93.0 | 0.8 |
| 5 | [40(TiC + TiO$_2$)—60Al$_2$O$_3$] 3.5MgO.Al$_2$O$_3$—0.25ZrO$_2$ | 72 | 93.2 | 1.0 |
| 6 | [37(TiC + TiO$_2$)—63Al$_2$O$_3$] 3.5MgO.Al$_2$O$_3$—0.25ZrO$_2$ | 85 | 94.0 | 0.7 |
| 7 | [37(TiC + TiO$_2$)—63Al$_2$O$_3$] 3.5CoO.Al$_2$O$_3$—0.25ZrO$_2$ | 75 | 93.7 | 0.9 |
| 8 | [37(TiC + TiO$_2$)—63Al$_2$O$_3$] 3.5MgO.Al$_2$O$_3$—0.25ZrO$_2$ | 77 | 93.3 | 0.8 |
| 9 | [37(TiC + TiO$_2$)—63Al$_2$O$_3$] 3.5NiO.Al$_2$O$_3$—0.25ZrO$_2$ | 75 | 93.7 | 0.9 |
| 10 | [30(TiC + TiO$_2$)—70Al$_2$O$_3$] 3.5MgO.Al$_2$O$_3$ | 80 | 93.9 | 1.5 |
| 11 | [30(TiC + TiO$_2$)—70Al$_2$O$_3$] 17.5MgO.Al$_2$O$_3$ | 73 | 93.5 | 1.0 |
| 12 | [40(TiC + TiO$_2$)—60Al$_2$O$_3$] 1.5MgO.Al$_2$O$_3$ | 78 | 93.8 | 1.7 |
| 13 | [40(TiC + TiO$_2$)—60Al$_2$O$_3$] 3.5MgO.Al$_2$O$_3$ | 75 | 93.5 | 1.3 |
| 14 | [37(TiC + TiO$_2$)—63Al$_2$O$_3$] 1.0MgO | 70 | 93.5 | 1.5 |

Figure 7:
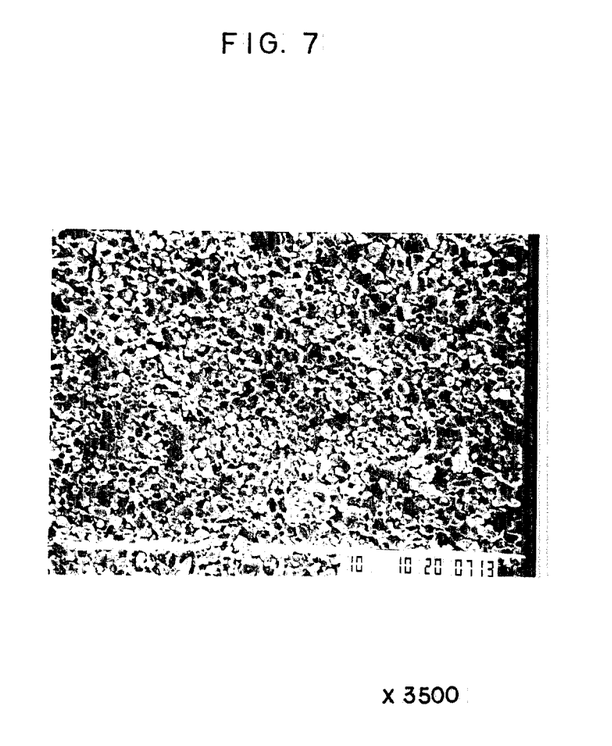
FIG. 7 is a photograph of the broken-out section of one embodiment (Sample No. 4) of the present invention, which was taken with a scanning type electron microscope.

Sample No. 6 indicates that the HIP process is also effective for sintering the structure of the present invention. As a result of investigations of the HIP products which are within the compositional range according to the present invention, and contain other machinability-improving agents such as MnO-Al$_2$O$_3$, NiO-Al$_2$O$_3$ and CoO-Al$_2$O$_3$, it has been ascertained that they have an average crystal grain size of 1.3 microns or less and are effective for use in the substrate materials for magnetic heads (sliders). FIG. 7 is a photograph showing a broken section of Sample No. 4.

It should be understood that the modifications may be done without departing from the gist and the essential concept of the present invention as disclosed and claimed hereinbelow.

What is claimed is:

1. An alumina base substrate material for recording heads, which comprises a densely sintered body consisting essentially of:
   per 100 parts by weight of a base component of 30 to 40% by weight of a mixture of carbide and oxide of titanium having a TiO$_2$ to (TiC+TiO$_2$) percentage of 5 to 15% by weight and the balance being Al$_2$O$_3$,
   components A, B and C, provided that the A to B ratio is within a hatched KLMN area in FIG. 1, in the following given parts by weight, and
   oxidic impurities in amounts of no higher than 0.2% by weight based on the total composition,
   said sintered body having an average crystal grain size of no higher than 1.3 microns, a porosity per area of no higher than 0.5%, a bending strength of at least 70 kg/cm$^2$ and a hardness H$_R$A of at least 93.0: wherein
   component A is at least one of spinels expressed by RO-Al$_2$O$_3$, where R is at least one of Mg, Mn, Ni and Co, in an amount of 2.0 to 17.5 parts by weight,
   component B is ZrO$_2$ in an amount of 0.2 to 2.0 parts by weight, and
   component C is a Y$_2$O$_3$ in an amount of 0.05 to 2.0 parts by weight.

2. A substrate material as defined in claim 1, in which Al$_2$O$_3$, TiC, TiO$_2$, Y$_2$O$_3$, ZrO$_2$ and the spinels are uniformly dispersed in an average crystal grain size of 0.5 to 1.3 microns, and 90% or more of the crystal grains forming the overall sintered body is within a range of 0.5 to 1.3 microns.

3. A process for the production of alumina base substrate materials for recording heads, which comprises:
   providing a starting material consisting essentially of:
   per 100 parts by weight of a powdery base component of 30 to 40% by weight of TiC and TiO$_2$ each having an average particle size of no more than 1.5 microns wherein a TiO$_2$/(TiC+TiO$_2$) percentage is 5 to 15% by weight, and the balance being Al$_2$O$_3$,
   a mixture of components A, B and C with the proviso that the A to B ratio is within a hatched KLMN area in FIG. 1,
   provided that the amount of oxidic impurities contained in said starting material is 0.2% by weight or lower: wherein
   component A is at least one of spinels expressed by RO-Al$_2$O$_3$ where R is at least one of Mg, Mn, Ni and Co in amount of 2.0 to 17.5 parts by weight,
   component B is ZrO$_2$ in an amount of 0.2 to 2.0 parts by weight, and
   component C is Y$_2$O$_3$ in an amount of 0.05 to 2.0 parts by weight; and
   press sintering said starting material at a temperature from about 1350° to 1650° C. in a non-oxidizing atmosphere.

4. A material as defined in claim 1, wherein the KLMN area in FIG. 1 is defined by the following coordinates (x, y) where x represents the component B and y represents the component A:
   K: (0.2, 10.5),
   L: (0.2, 2.0),
   M: (2.0, 7.0), and
   N: (2.0, 17.5).

5. A process as defined in claim 3, wherein the KLMN area in FIG. 1 is defined by the following coordinates (x, y) where x represents the component B and y represents the component A:
   K: (0.2, 10.5),
   L: (0.2, 2.0),
   M: (2.0, 7.0), and
   N: (2.0, 17.5).

6. A material as defined in claim 1, wherein the component A amounts to 2.0–10.5 parts by weight.

7. A process as defined in claim 3, wherein the component A amounts to 2.0–10.5 parts by weight.

8. A material as defined in claim 1, wherein R of the component A is Mg.

9. A material as defind in claim 1, wherein R of the component A is Mn.

10. A material as defined in claim 1, wherein R of the component A is Ni.

11. A material as defined in claim 1, wherein R of the component A is Co.

12. A process as defined in claim 3, wherein the press sintering is effected under application of a pressure of at least about 150 kg/cm$^2$.

13. A process as defined in claim 3, wherein the sintering is effected at 1600° C. or less.

14. A material as defined in claim 2, wherein the crystal grains have an average size of 1.0 micron or less.

15. A material as defined in claim 2, wherein the bending strength is at least 75 kg/cm$^2$.

16. A material as defined in claim 2, wherein the porosity per area is no higher than 0.4%.

17. A material as defined in claim 2, wherein the hardness H$_R$A is at least 93.5.

18. A recording head slider comprising a substrate member formed of the material as defined in claim 1.

19. A recording head slider comprising a substrate member formed of the product of the process as defined in claim 3.

* * * * *